United States Patent
Yang et al.

(10) Patent No.: US 8,775,567 B2
(45) Date of Patent: Jul. 8, 2014

(54) SYSTEM AND METHOD FOR CONVERTING CONTENT

(75) Inventors: Jin Hong Yang, Daejeon (KR); Jung Ho Lee, Seoul (KR); Hyo Jin Park, Daejeon (KR); Jun Kyun Choi, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 242 days.

(21) Appl. No.: 12/951,776

(22) Filed: Nov. 22, 2010

(65) Prior Publication Data

US 2011/0258291 A1 Oct. 20, 2011

(30) Foreign Application Priority Data

Apr. 14, 2010 (KR) .................. 10-2010-0034357

(51) Int. Cl.
*G06F 15/16* (2006.01)
*G06F 15/173* (2006.01)

(52) U.S. Cl.
USPC ............... 709/219; 725/39; 725/91; 725/100; 725/109; 725/110; 725/111; 725/131; 709/224

(58) Field of Classification Search
USPC ......... 709/206, 219, 224, 231, 232, 248, 246; 725/39, 91, 100, 109–110, 114, 131
See application file for complete search history.

(56) References Cited

U.S. PATENT DOCUMENTS

| 6,442,598 | B1* | 8/2002 | Wright et al. ............... 709/217 |
| 7,039,858 | B2* | 5/2006 | Humpleman et al. ........ 715/205 |
| 7,149,981 | B1* | 12/2006 | Lundy et al. ............... 715/767 |
| 7,216,170 | B2* | 5/2007 | Ludvig et al. ............... 709/225 |
| 2004/0031058 | A1* | 2/2004 | Reisman ..................... 725/112 |
| 2006/0265427 | A1* | 11/2006 | Cohen et al. ................ 707/200 |
| 2009/0183206 | A1* | 7/2009 | Lee et al. ...................... 725/56 |
| 2010/0138863 | A1* | 6/2010 | Diaz Perez .................. 725/42 |

FOREIGN PATENT DOCUMENTS

| KR | 2003-0079919 | 10/2003 |
| KR | 2010-0029700 | 3/2010 |

OTHER PUBLICATIONS

Office Action for related Korean Application No. 10-2010-0034357, Office Action dated Jul. 1, 2011.

* cited by examiner

*Primary Examiner* — Ario Etienne
*Assistant Examiner* — Kidest Mendaye
(74) *Attorney, Agent, or Firm* — Fox Rothschild LLP

(57) ABSTRACT

Provided is a content converting method and system. The content converting method and system may extract web content elements from collected web contents, may extract domain elements from a web page including the web contents, may match the extracted elements with broadcast content elements and thus, may enable the web contents to be played in a broadcast receiving apparatus.

4 Claims, 8 Drawing Sheets

SYSTEM AND METHOD FOR CONVERTING CONTENT

CROSS-REFERENCE TO RELATED APPLICATION

This application claims the benefit of Korean Patent Application No. 10-2010-0034357, filed on Mar. 14, 2010, in the Korean Intellectual Property Office, the disclosure of which is incorporated herein by reference.

BACKGROUND

The present invention relates to a content converting method and system, and more particularly, to a content converting method and system that may perform a predetermined process to enable various types of contents to be played in a broadcast receiving apparatus.

DESCRIPTION OF THE RELATED ART

As the Internet has been developing and has been widely used, a great number of people obtain information through the Internet.

In addition, as demand for the Internet increases, contents including images, articles, and the like are provided to users through web pages. More and more, various types of web contents produced online are being provided and an amount of web contents are also increasing compared with an amount of broadcast contents produced by broadcasting stations. Therefore, viewers or users want to play the web contents using broadcast receiving apparatuses, such as an Internet protocol television (IPTV), and the like.

The format of the web contents is different from the format of the broadcast content played in the broadcast receiving apparatus. For example, content providers may generate an electronic program guide (EPG) suitable for each service environment to provide information associated with the same content in a TV, PC, and mobile service environment, such as 3Screen.

Therefore, the broadcast receiving apparatus may use a converting apparatus converting web contents into the format for a broadcasting service, to use the web contents.

Also, there is a desire for a method of playing the web contents produced online in the broadcast receiving apparatus by transmitting the converted contents.

SUMMARY OF THE DISCLOSURE

An aspect of the present invention provides a content converting method and system that may convert a web content produced online to be played in a broadcast receiving apparatus, by matching a hierarchy of web content elements and a hierarchy of broadcast content elements.

An aspect of the present invention provides a web page generating method and apparatus that may generate a web page based on a micro format that is generated based on a broadcast content format and thus, may enable a web content produced online to be played in a broadcast receiving apparatus without hierarchy-matching.

According to an aspect of the present invention, there is provided a content converting method, the method including extracting web content elements from a web content, and extracting domain elements from a web page including the web content, and matching a hierarchy of the web content elements and the domain elements with a hierarchy of broadcast content elements.

The web content may be collected from at least one web page, and the matching may perform the hierarch matching to enable the at least one collected web content to be played in a broadcast receiving apparatus.

The broadcast content elements may include a provision information element, a service information table element, and a virtual channel map table element, and the matching may match the web content elements with the provision information element, and may match the domain elements with the service information table and the virtual channel map table element.

The domain elements may include a head, a body, and an address of the web page including the web content, and the matching may match the address of the web page with the provision information element, and may match the head and the body with the virtual channel map table element.

According to an aspect of the present invention, there is provided a content converting system, the system including an element extractor to extract web content elements from a web content and to extract domain elements from a web page including the web content, and a matching unit to match a hierarchy of the web content elements and the domain elements with a hierarchy of broadcast content elements.

According to an aspect of the present invention, there is provided a web page generating method, the method including generating a micro format that is based on a broadcast content format, and generating the web page based on the generated micro format.

The generating of the micro format may include generating the micro format to enable a hierarchy of broadcast content elements to correspond to a hierarchy of web content elements.

The broadcast content elements may include a provision information element, a service information table element and a virtual channel map table element, and the generating of the micro format may include generating the micro format including an author element corresponding to the provision information element, a feed element, an entry element, an entry-title element corresponding to the service information table element, and an entry-content element corresponding to the virtual channel map table element.

The method may further include obtaining domain elements of the generated web page, and the generating of the micro format may include generating the micro format to enable the obtained domain elements to correspond to the author element.

The method may further include transmitting web content elements of a web content included in the generated web page.

According to an aspect of the present invention, there is provided a web page generating apparatus, the apparatus including a micro format generating unit to generate a micro format that is based on a broadcast content format, and a web page generating unit to generate a web page based on the generated micro format.

Additional aspects, features, and/or advantages of the invention will be set forth in part in the description which follows and, in part, will be apparent from the description, or may be learned by practice of the invention.

Example embodiments provide a content converting method and system that may convert a web content produced online to be played in a broadcast receiving apparatus, by matching a hierarchy of web content elements and a hierarchy of broadcast content elements.

Example embodiments provide a web page generating method and apparatus that may generate a web page based on a micro format that is generated based on a broadcast content format and thus, may enable a web content produced online to be played in a broadcast receiving apparatus without hierarchy-matching.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION OF THE PRESENTLY PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
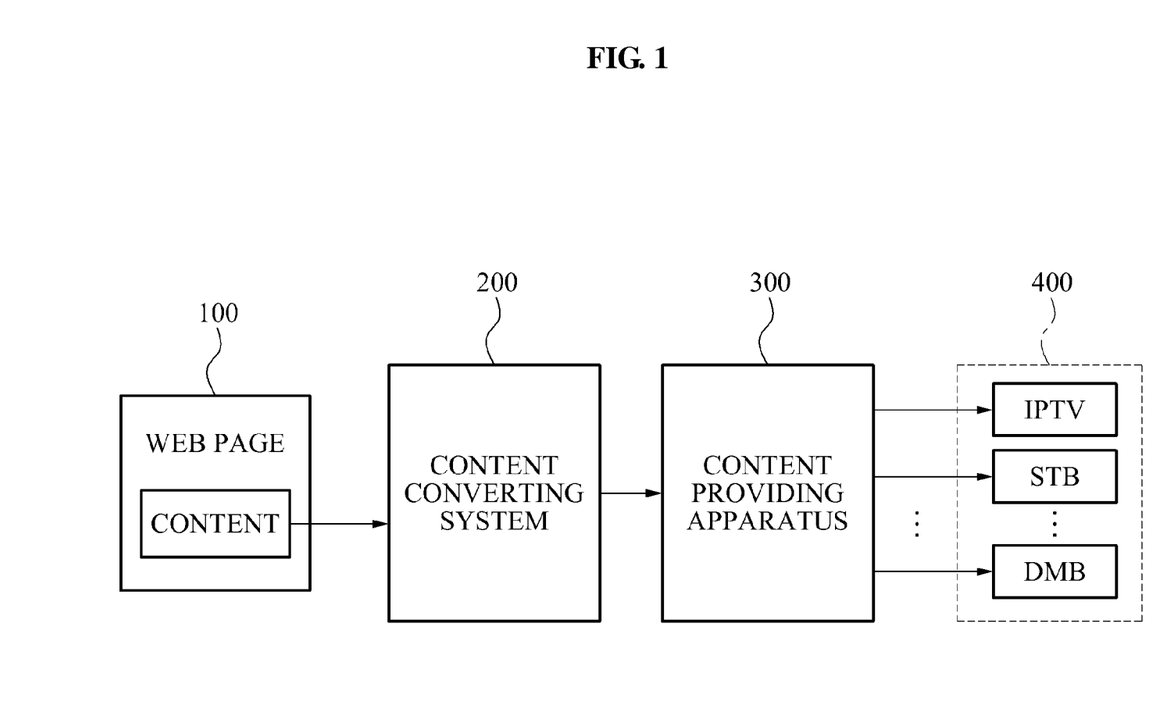
FIG. 1 is a diagram illustrating a configuration of a network including a content converting system according to an example embodiment of the present invention.

FIG. 1 illustrates a configuration of a network including a content converting system according to an example embodiment of the present invention.

Referring to FIG. 1, a web page 100 may provide a web content to a user. The web page 100 may provide various types of web service to the user, and the web page 100 may be managed and provided by multiple web service providers.

A content providing apparatus 300 may provide a broadcast content to a broadcast receiving apparatus 400, such as an Internet protocol television (IPTV), a set top box (STB), a digital multimedia broadcasting (DMB), a navigation, and the like. In this example, the content providing apparatus 300 may provide a cable broadcasting, a satellite broadcasting, a digital broadcasting, and an analog broadcasting, and the like, to a broadcast receiving apparatus 400. The broadcast receiving apparatus 400 may play the broadcast content. In this example, the broadcast content may include a moving picture, a still image, news, an article, and the like.

In this example, a format of the web content is different from a format of the broadcast content and thus, a content converting system 200 may convert the format of the web content into a format that allows the web content to be played in the broadcast receiving apparatus 400. The content converting system 200 may be configured separately from the content providing apparatus 300 and may be configured as a module in the content providing apparatus 300.

Figure 2:
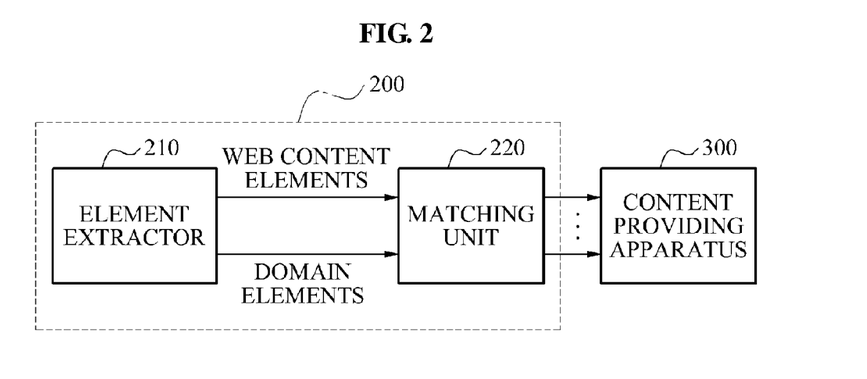
FIG. 2 is a diagram illustrating a configuration of a content converting system according to an example embodiment of the present invention.
Figure 3:
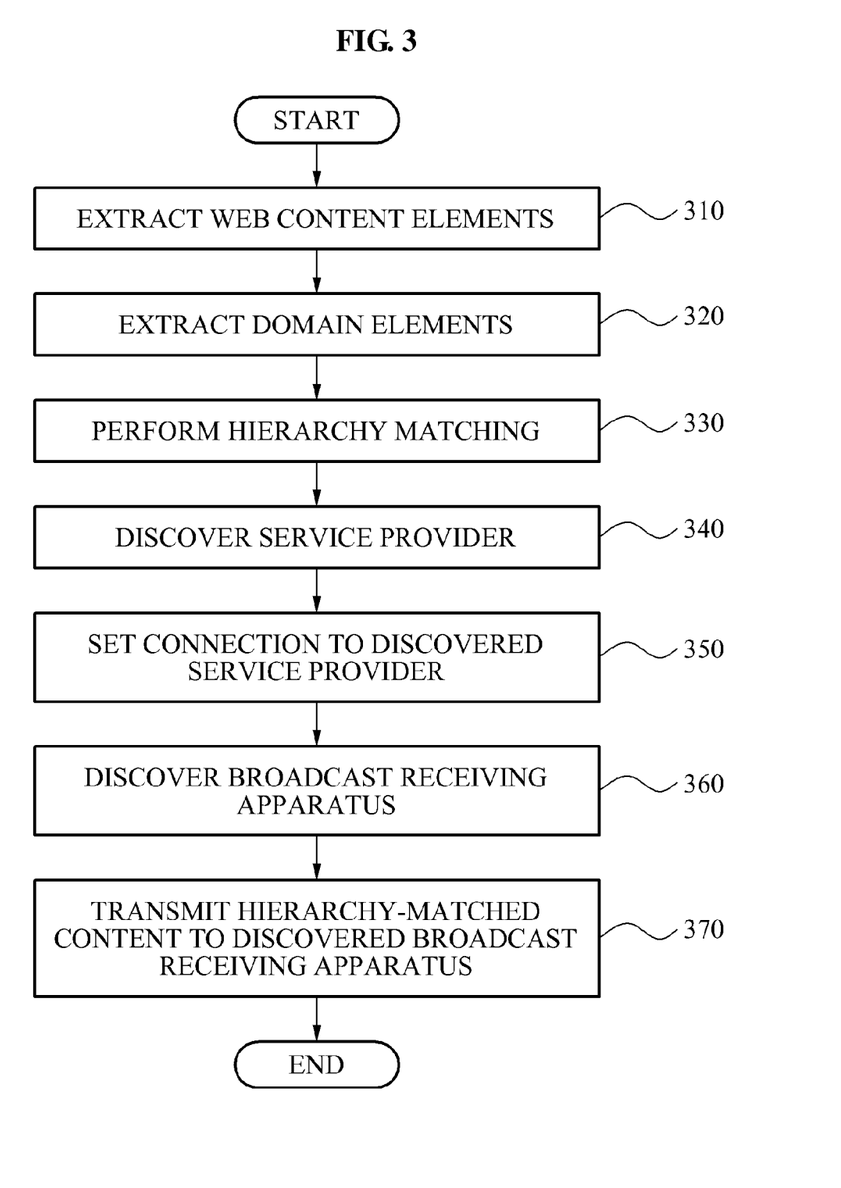
FIG. 3 is a flowchart illustrating a content converting method according to an example embodiment of the present invention.

FIG. 2 illustrates a configuration of a content converting system 200 according to an example embodiment of the present invention. FIG. 3 illustrates a content converting method according to an example embodiment of the present invention.

Referring to FIG. 2, the content converting system 200 may include an element extractor 210 and a matching unit 220.

Figure 4:
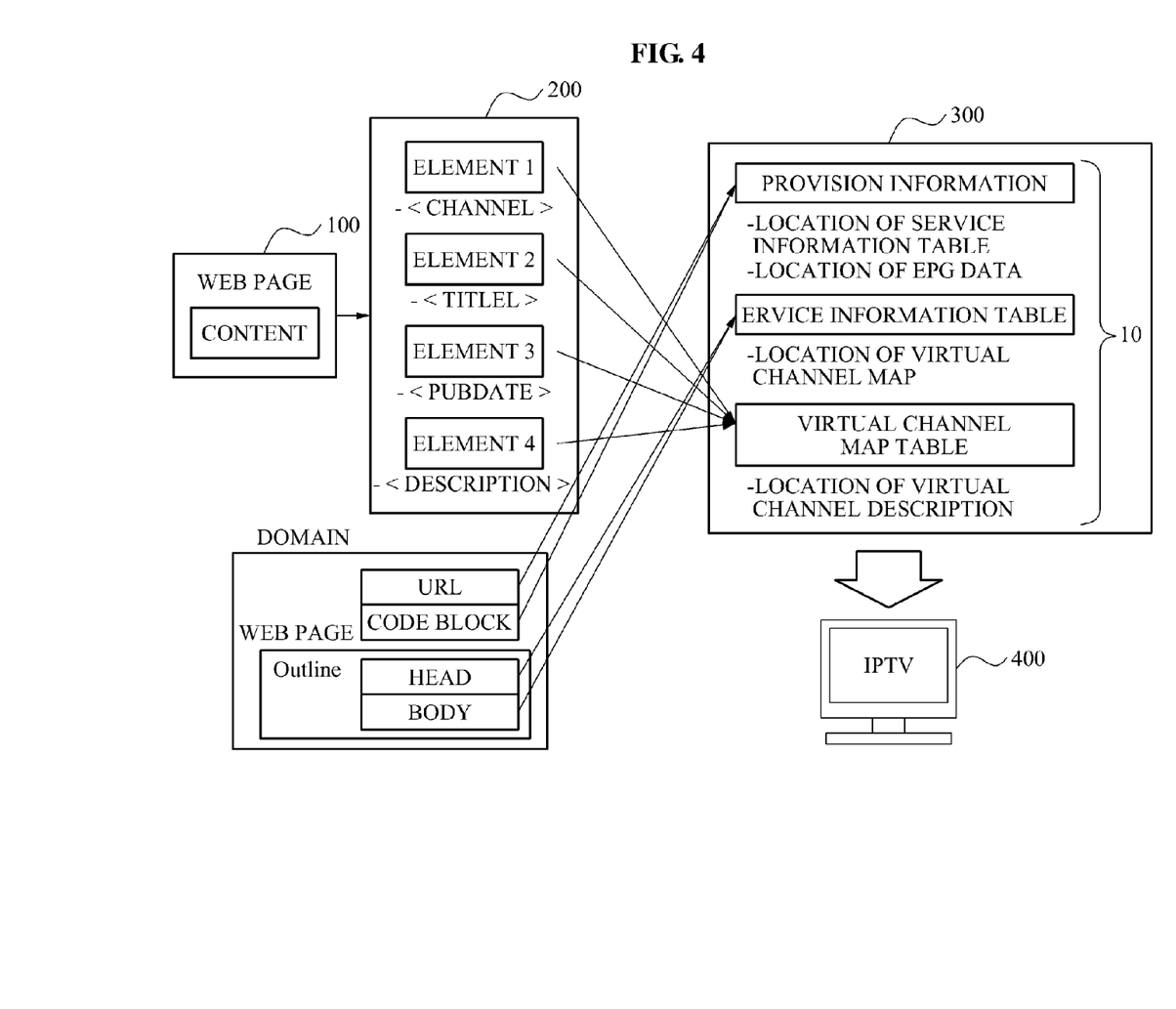
FIG. 4 is a diagram illustrating a method of matching a hierarchy of web content elements according to an example embodiment of the present invention.

First, referring to FIGS. 2 and 3, the element extractor 210 extracts web content elements from at least one collected web content in operation 310. For example, the element extractor 210 may analyze the web content and may extract a channel element, a title element, a publication date element, and a description element, as the web content elements, as shown in FIG. 4.

In this example, the element extractor 210 may analyze the web content by performing parsing. In this example, the web content may be collected from multiple web pages using Really Simple Syndication (RSS) or ATOM. Multiple web contents may be collected from a single web page.

The element extractor 210 extracts domain elements from a web page in operation 320. For example, the domain elements may include address information of the web page, a head, and a body. In this example, an URL may be used as the address information.

The matching unit 220 may match a hierarchy of the extracted elements with a hierarchy of broadcast content elements in operation 330. In this example, the matching unit 220 may match a hierarchy of elements in a web content format with a hierarchy of elements in a broadcast content format, using the extracted elements. In this example, the broadcast content may be satisfied with a broadcast standard defined to play broadcast contents in the broadcast receiving apparatus 400, and the broadcast content elements may include provision information, a service information table, and a virtual channel map table.

For example, referring to FIG. 4, the matching unit 220 may match the web content elements with a hierarchy of virtual channel map table. In this example, the virtual channel map table may include a location of a virtual channel description.

The matching unit 220 may match the domain elements with a hierarchy of the provision information and service information table. In this example, the matching unit 220 may match the URL among the domain elements with the hierarchy of the provision information. The matching unit 220 may match the head and the body with the hierarchy of the service information table. In this example, the provision information may include a location of a master service information (SI) table and a location of electronic program guide (EPG) data, and the service information table may include a location of the virtual channel map.

The content providing apparatus 300 may discover a service provider in operation 340. In this example, the service provider may be a broadcast service provider or a content aggregator. The broadcast service provider may include a broadcasting station, a cable broadcasting station, and the like.

For example, when a content is serviced through an IPTV and the like, the content providing apparatus 300 may discover broadcasting stations, such as an ABC broadcasting station, a CNN broadcasting station, a BBC broadcasting station, and the like, that provide broadcast services through the IPTV. In this example, the content providing apparatus 300 may select one of discovered service providers.

The content providing apparatus 300 set a connection to the discovered service provider in operation 350.

For example, when the ABC broadcasting station is selected in operation 340, the content providing apparatus 300 may obtain a representative URL of the ABC broadcasting station. The content providing apparatus 300 may access the Internet based on the obtained URL to set a connection to the ABC broadcasting station. The content providing apparatus 300 may obtain broadcast information provided by the ABC broadcasting station. In this example, EPG information may be used as the broadcast information.

The content providing apparatus 300 may discover a broadcasting service provided by a service provider connected to provide a hierarchy-matched content in operation 360.

For example, in operation 350, when the connection to ABC broadcasting station is set, the content providing apparatus 300 may discover broadcast channel numbers serviced by the ABC broadcasting station, such as channel 1, channel 2, channel 7, and the like.

For another example, when the connection to the CNN broadcasting station is set, the content providing apparatus 300 may discover content genres serviced by the CNN broadcasting station, such as a drama, sport news, a documentary, a music, current affairs, an educational program, and the like.

When a broadcast service is selected, the content providing apparatus 300 transmits, to the broadcast receiving apparatus 400, the hierarchy-matched content in operation 370. The broadcast receiving apparatus 400, such as a TV, an IPTV, and the like, may play the received content. The web content may be played in the IPTV by matching the hierarchy of the elements in web content format with the hierarchy of the elements in the broadcast content format.

In this example, when the broadcast service is selected, the content providing apparatus 300 may transmit, to the broadcast receiving apparatus 400, a program guide of the selected broadcast service.

For example, when the channel 1 of the ABC broadcasting station is selected as the broadcast service in operation 360, the content providing apparatus 300 may match a hierarchy of a web-based program guide provided by channel 1 with a content information providing hierarchy of ATIS Consumer Domain Device Configuration (CDDC), and may transmit the hierarchy-matched program guide to the broadcast receiving apparatus 400. In this example, the content information providing hierarchy of the ATIS CDDC may be a hierarchy 10 of broadcast content elements stored in a database of the content providing apparatus 300.

In example embodiments described with reference to FIGS. 2 and 3, the domain elements are extracted after the web content elements are extracted, however, web content elements may be extracted after the domain elements are extracted. The element extractor 210 may simultaneously extract the web content elements and the domain elements. Operation 320 may be performed prior to operation 310, and operation 310 and operation 320 may be performed together.

A process of playing the web content in the broadcast receiving apparatus by the hierarchy matching has been described. However, the web content may be played in the broadcast receiving apparatus without performing the hierarchy matching.

Figure 5:
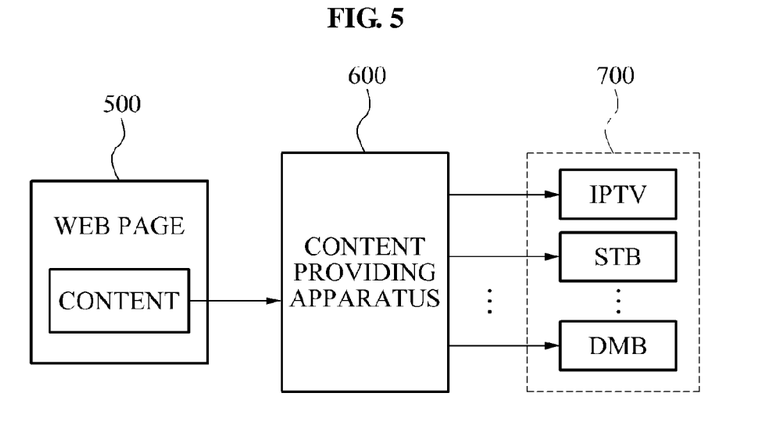
FIG. 5 is a diagram illustrating a configuration of system for playing a web content in a broadcast receiving apparatus according to an example embodiment of the present invention.

FIG. 5 illustrates a configuration of a system for playing a web content in a broadcast receiving apparatus according to an example embodiment of the present invention.

Referring to FIG. 5, a web page generating apparatus 500 may generate a web page based on a micro format. The web page generating apparatus 500 may provide, to a user, a web content included in the generated web page. In this example, the web page may be generated based on the micro format, using hATOM.

The content providing apparatus 600 may transmit, to broadcast receiving apparatus 700, web content elements of the received web content. For example, referring to FIG. 4, the content providing apparatus 600 transmits the hierarchy-matched web content elements, to the broadcast receiving apparatus 700 in operation 370.

In this example, a TV, an IPTV, an STB, a DMB, a navigation terminal, and the like, which are CDDC-based broadcast receiving apparatuses, may be used as the broadcast receiving apparatus 700. The broadcast receiving apparatus 700 may play a broadcast content generated based on the received web content elements. In the present embodiment, examples of the broadcast content may include a moving picture, a still image, news, and an article.

Figure 6:
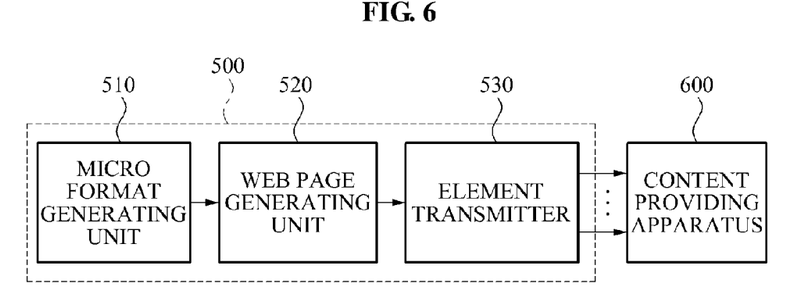
FIG. 6 is a diagram illustrating a configuration of a web page generating apparatus according to an example embodiment of the present invention.
Figure 7:
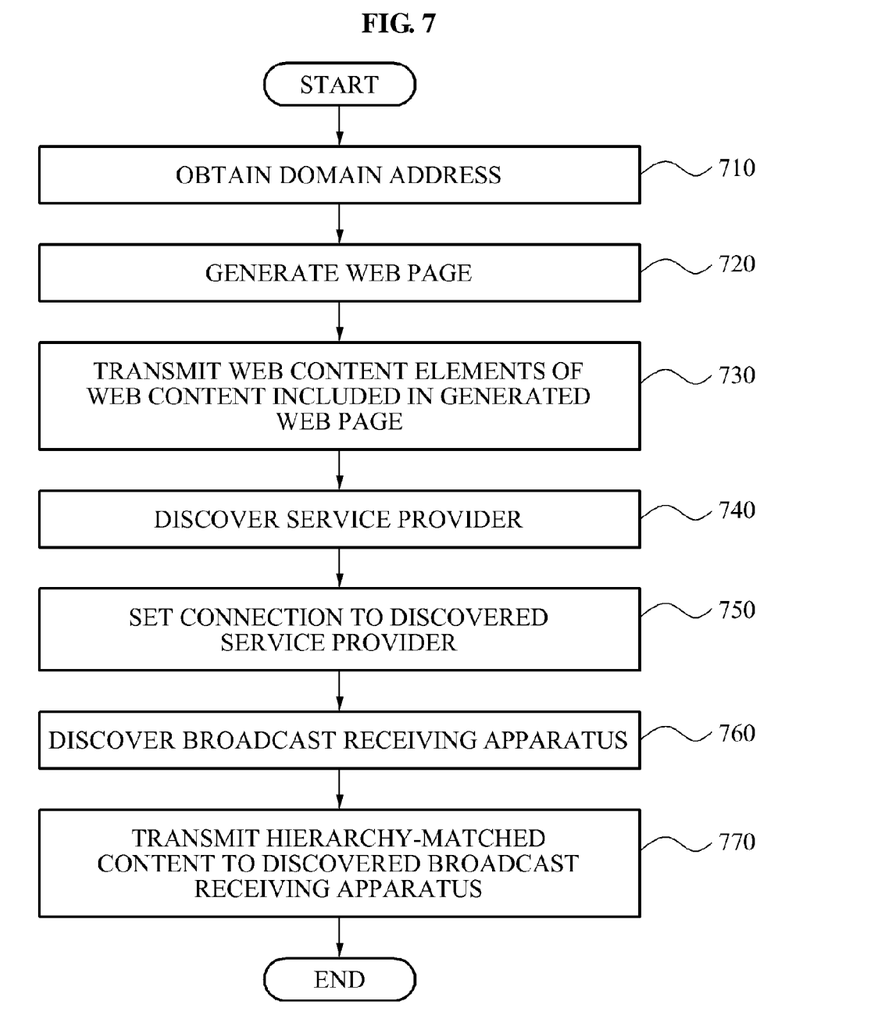
FIG. 7 is a flowchart illustrating a web page generating method according to an example embodiment of the present invention.

FIG. 6 illustrates a configuration of a web page generating apparatus according to an example embodiment of the present invention. FIG. 7 is a flowchart illustrating a web page generating method according to an example embodiment of the present invention Referring to FIG. 6, the web page generating apparatus 500 may include a micro format generating unit 510, a web page generating unit, and an element transmitter 530.

Referring to FIGS. 6 and 7, the micro format generating unit 510 obtains domain elements of a web page that the micro format generating unit 510 desires to generate in operation 710.

Figure 8:
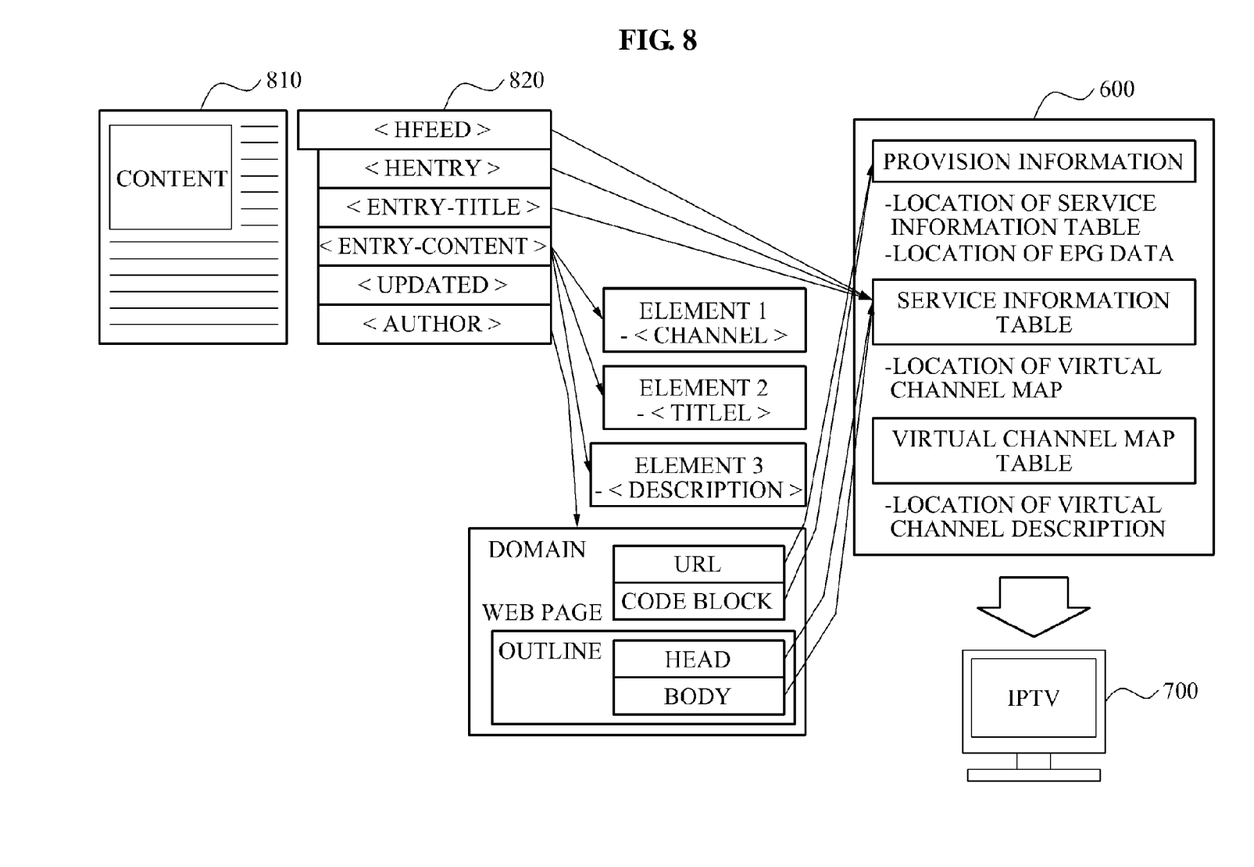
FIG. 8 is a diagram illustrating a micro format generating method according to an example embodiment of the present invention.

The micro format generating unit 510 generates a micro format based on a broadcast content format in operation 720. For example, the micro format generating unit 510 generates the micro format to enable a hierarchy of broadcast content elements to correspond to a hierarchy of web content elements in operation 720. In this example, the micro format generating unit 510 may generate a micro format 820 using hATOM as illustrated in FIG. 8. FIG. 8 illustrates a micro format generating method according to an example embodiment of the present invention.

For example, an hfeed element, an hentry element, and an entry-title element in the generated macro format 820 may correspond to the service information table of the content providing apparatus 600. An entry-content element may correspond to a virtual channel map table, and an author element may correspond to provision information. In this example, the author element may include the domain elements obtained in operation 710.

The entry-content element may include a channel element and elements in Table 1 from among web content elements. In this example, the entry-content element may absolutely include the channel element, a title element, a link element, and a description element from among the web content elements.

Child elements of the channel element are organized in Table 1.

TABLE 1

| element | |
|---|---|
| <category> | Optional |
| <cloud> | Optional |
| <copyright> | Optional |
| <description> | Required |

TABLE 1-continued

| element | |
| --- | --- |
| <docs> | Optional |
| <generator> | Optional |
| <image> | Optional |
| <language> | Optional |
| <lastBuildDate> | Optional |
| <link> | Required |
| <managingEditor> | Optional |
| <pubDate> | Optional |
| <rating> | Optional |
| <skipDays> | Optional |
| <skipHours> | Optional |
| <textInput> | Optional |
| <title> | Required |
| <ttl> | Optional |
| <webmaster> | Optional |

A web page generating unit 520 generates a web page 810 based on the generated micro format 820 in operation 730. In this example, the generated web page 810 may include at least one content. Accordingly, web content elements of a web content included in the generated web page may correspond to a hierarchy of broadcast content element and thus, matching of the hierarchy may not be needed.

The element transmitter 530 transmits the web content elements of the web content included in the generated web page to the content providing apparatus 600 in operation 740.

The content providing apparatus 600 discovers a service provider in operation 750.

The content providing apparatus 600 sets a connection to the discovered service provider in operation 760.

The content providing apparatus 600 discovers a broadcast service provided by the connected service provider in operation 770. Operations 750 through 770 may be the same as operations 340 through 360 and thus, detailed descriptions thereof will be omitted.

When the broadcast service is selected, the content providing apparatus 600 transmits the web content elements to the broadcast receiving apparatus 700 in operation 780. The broadcast receiving apparatus 700, such as an IPTV and the like, may play the received web content. Accordingly, when the web page is generated based on the hierarchy of the broadcast content elements, the web content may be played in the IPTV without the hierarchy matching.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard to disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of converting web content to broadcast content for play on a broadcast receiving apparatus, the method comprising:
    extracting web content elements from a web content in at least one web page, wherein the web content elements including a channel element, a title element and a description element of the web content;
    extracting domain elements from the at least one web page including a URL, code block, head and body of the web content;
    matching a hierarchy of the web content elements and the domain elements with a hierarchy of broadcast content elements, the broadcast content elements including a provision information element, a service information table element, and a virtual channel map table element, and wherein the matching includes matching the URL and code block with the provision information element, wherein the matching matches the head and body with the service information table element, and wherein the matching matches at least one of the channel element, title element and description element with the virtual channel map table element;
    wherein the web content is collected from the at least one web page, and
    wherein the matching of the hierarchy of web content elements and the domain elements with the hierarchy of broadcast content elements enables at least some of the web content to be played in the broadcast receiving apparatus.

2. The method of claim 1 wherein the web content elements further include a link element.

3. A system of converting a content, the system comprising:
    an element extractor configured to extract web content elements from a web content in at least one web page and to extract domain elements from the at least one web page including the web content, the web content elements including a channel element, a title element and a description element, the domain elements including a URL, code block, head and body; and
    a matching unit configured to match a hierarchy of the web content elements and the domain elements with a hierarchy of broadcast content elements, the broadcast content elements including a provision information element, a service information table element, and a virtual channel map table element, and wherein the matching unit matches the URL and code block with the provision information element, wherein the matching unit matches the head and body with the service information table element, and wherein the matching unit matches at least one of the channel element, title element and description element with the virtual channel map table element;
    wherein the web content is collected from the at least one web page, and
    wherein the matching unit enables at least some of the web content to be played in a broadcast receiving apparatus.

4. The system of claim 3, wherein the web content elements further include a link element.

* * * * *